(12) United States Patent
Quan et al.

(10) Patent No.: US 10,967,334 B2
(45) Date of Patent: Apr. 6, 2021

(54) MIXING DEVICE AND AFTERTREATMENT DEVICE

(71) Applicant: Daimler AG, Stuttgart (DE)

(72) Inventors: Peng Quan, Novi, MI (US); Justin Kosik, Canton, MI (US); Corey Bertch, Canton, MI (US); Eric Caruth, Grosse Ile, MI (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/314,838

(22) PCT Filed: Jun. 26, 2017

(86) PCT No.: PCT/EP2017/000738
§ 371 (c)(1),
(2) Date: Jan. 2, 2019

(87) PCT Pub. No.: WO2018/006993
PCT Pub. Date: Jan. 11, 2018

(65) Prior Publication Data
US 2020/0009514 A1 Jan. 9, 2020

(30) Foreign Application Priority Data

Jul. 5, 2016 (GB) .................................... 1611677

(51) Int. Cl.
*F01N 3/28* (2006.01)
*B01D 53/94* (2006.01)
(Continued)

(52) U.S. Cl.
CPC ...... *B01F 3/04049* (2013.01); *B01D 53/9431* (2013.01); *B01F 5/0451* (2013.01);
(Continued)

(58) Field of Classification Search
CPC .... B01F 3/04049; B01F 5/0647; B01F 5/064; B01F 5/0606; B01F 5/0498; B01F 5/0451;
(Continued)

(56) References Cited

U.S. PATENT DOCUMENTS 6,444,177 B1 * 9/2002 Muller ............... B01D 53/8631
422/177
8,572,949 B2 11/2013 Wirth
(Continued)

FOREIGN PATENT DOCUMENTS

| CN | 101353975 A | 1/2009 |
|---|---|---|
| CN | 101469627 A | 7/2009 |

(Continued)

OTHER PUBLICATIONS

PCT/EP20171000738, International Search Report dated Sep. 12, 2017 (Two (2) pages).
(Continued)

*Primary Examiner* — Matthew T Largi
(74) *Attorney, Agent, or Firm* — Crowell & Moring LLP

(57) ABSTRACT

A mixing device for mixing exhaust gas from a combustion engine of a vehicle with a solution for lowering the content of nitrogen oxides in the exhaust gas includes a casing with an exhaust inlet, an exhaust outlet, and a corner region in which an exhaust gas flow is diverted toward the exhaust outlet. The corner region has an opening for a dosing unit. A flow guide is arranged within the casing. The flow guide is configured to divide a total of the exhaust gas flow into a first exhaust gas stream and a second exhaust gas stream. A gap for the second exhaust gas stream is formed between the flow guide and a side wall of the casing. In the side wall the
(Continued)

opening for the dosing unit is located. An end region of the flow guide is arranged upstream of the opening for the dosing unit.

8 Claims, 3 Drawing Sheets

(51) Int. Cl.
    *B01F 3/04* (2006.01)
    *B01F 5/04* (2006.01)
    *B01F 5/06* (2006.01)
(52) U.S. Cl.
    CPC ............ *B01F 5/0498* (2013.01); *B01F 5/064* (2013.01); *B01F 5/0606* (2013.01); *B01F 5/0647* (2013.01); *F01N 3/2892* (2013.01); *F01N 2240/20* (2013.01); *F01N 2610/02* (2013.01)
(58) Field of Classification Search
    CPC .. B01F 5/0473; B01F 5/0403; B01F 3/04021; F01N 3/2892; F01N 2610/02; F01N 2240/20; F01N 3/2821; F01N 3/2066; F01N 3/206; B01D 53/9431; Y02A 50/2325; Y02T 10/20; Y02T 10/24
    See application file for complete search history.

(56) References Cited

U.S. PATENT DOCUMENTS

| | | | | |
|---|---|---|---|---|
| 9,604,170 | B2* | 3/2017 | Kimura | B01F 5/0065 |
| 9,803,528 | B2* | 10/2017 | Peters | F01N 3/2066 |
| 2007/0000240 | A1* | 1/2007 | Hirata | B01D 53/9431 60/286 |
| 2007/0036694 | A1* | 2/2007 | Nishioka | B01D 53/90 422/168 |
| 2009/0158722 | A1* | 6/2009 | Kojima | B01F 3/04049 60/297 |
| 2009/0313979 | A1* | 12/2009 | Kowada | B01D 53/9431 60/297 |
| 2010/0146950 | A1* | 6/2010 | Hayashi | B01D 53/9431 60/301 |
| 2010/0212292 | A1* | 8/2010 | Rusch | F01N 3/2892 60/274 |
| 2011/0308234 | A1* | 12/2011 | De Rudder | B01F 3/04049 60/295 |
| 2012/0144812 | A1* | 6/2012 | Hyun | B01F 3/04049 60/301 |
| 2013/0167516 | A1* | 7/2013 | Loman | B01F 5/0451 60/319 |
| 2015/0041996 | A1* | 2/2015 | Kowada | F01N 3/206 261/76 |
| 2015/0202569 | A1* | 7/2015 | Kimura | F01N 3/2066 422/148 |
| 2016/0047288 | A1* | 2/2016 | Arrowsmith | F01N 3/2066 60/274 |
| 2020/0040792 | A1* | 2/2020 | Boldt | B01F 5/0057 |

FOREIGN PATENT DOCUMENTS

| | | |
|---|---|---|
| CN | 102892988 A | 1/2013 |
| CN | 103154457 A | 6/2013 |
| CN | 105120993 A | 12/2015 |
| DE | 10 2011 077 155 A1 | 12/2012 |
| DE | 10 2014 104 2 | 10/2015 |
| EP | 2 022 956 A2 | 2/2000 |
| EP | 2 455 692 A2 | 6/2012 |
| EP | 2 578 828 A1 | 4/2013 |
| EP | 2 884 069 A1 | 6/2015 |
| GB | 2531012 A | 4/2016 |
| GB | 2533331 A | 6/2016 |
| JP | 2010-31779 A | 2/2010 |
| JP | 2010-180863 A | 8/2010 |
| JP | 2013-15099 A | 1/2013 |

OTHER PUBLICATIONS

Great Britain Search Report issued in Great Britain counterpart application no. GB1611677.4 dated Oct. 21, 2016 (Three (3) pages).
German-language European Office Action issued in European application No. 17 733 355.6-1004 dated Jan. 29, 2020 (Four (4) pages).
Chinese Office Action issued in Chinese application No. 201780036166.0 dated Jun. 9, 2020, with partial English translation (Nine (9) pages).
German-language European Office Action issued in European application No. 17 733 355.6-1004 dated Aug. 6, 2020 (Four (4) pages).

\* cited by examiner

MIXING DEVICE AND AFTERTREATMENT DEVICE

BACKGROUND AND SUMMARY OF THE INVENTION

The invention relates to a mixing device for mixing exhaust gas from a combustion engine of a vehicle with a solution for lowering the content of nitrogen oxides in the exhaust gas. The invention further relates to an aftertreatment device comprising such a mixing device.

Document EP 2 465 602 A2 describes a device for exhaust gas cleaning, wherein an aqueous urea solution is introduced into an exhaust gas flow flowing through an exhaust gas passage. With the aid of a flow guide the exhaust gas flow is divided into a centre flow flowing in the centre of the cross section of the exhaust gas passage and an edge flow circulating and advancing around the centre flow. The flow guide has an inner duct for the centre flow and blades arranged on the inner duct for steering the exhaust gas into a motion circulating the inner duct. The inner duct and the blades are placed within a casing.

Effective mixing of a solution for lowering the content of nitrogen oxides in exhaust gas, such as an aqueous urea solution, with the exhaust gas is critical in developing an effective selective catalytic reduction (SCR) system in an aftertreatment system or aftertreatment device. It is further critical to mitigate or eliminate the deposit of urea within the aftertreatment device. This is especially valid under the conditions of elevated engine $NO_x$ emissions. When the aqueous urea solution is fed into the exhaust gas, ammonia ($NH_3$) forms upon the hydrolysis of urea in the hot exhaust gas. This ammonia reacts with the nitrogen oxides ($NO_x$) that are present in the exhaust gas in a selective catalytic reduction (SCR) reaction within an SCR-catalyst of the aftertreatment system.

However, it was found that urea deposits can form within the urea mixing device. Excessive urea deposits can even clog the urea doser. In such a case, the vehicle equipped with the aftertreatment system comprising the mixing device would be forced to stop for service.

It is therefore the object of the present invention to provide an improved mixing device and an aftertreatment device comprising such a mixing device.

The mixing device according to the invention is configured for mixing exhaust gas from a combustion engine of a vehicle with a solution for lowering the content of nitrogen oxides in the exhaust gas. The mixing device comprises a casing with an exhaust inlet, an exhaust outlet and a corner region. In the corner region, an exhaust gas flow is diverted towards the exhaust outlet. The corner region has an opening for a dosing unit. The mixing device further comprises a flow guide arranged within the casing. The flow guide is configured to divide a total of the exhaust gas flow into a first exhaust gas stream and a second exhaust gas stream. Herein, a gap for the second exhaust gas stream is formed between the flow guide and a side wall of the casing, in which the opening for the dosing unit is located. An end region of the flow guide is arranged upstream of the opening for the dosing unit.

The invention is based on the finding that due to the form of the casing of the mixing device, in particular due to the configuration of the corner region, there is an intrinsic flow recirculating region within the mixing device which leads to an effective mixing of the solution, in particular the aqueous urea solution, and the exhaust gas. However, the recirculation of exhaust gas back towards the opening for the dosing unit carries a lot of urea spray or droplets back to the urea dosing unit area. This spray or these droplets then hit the side wall to which the dosing unit or doser is mounted, if the flow guide is not arranged in front of the side wall. This can lead to the formation of deposits of urea in the area of the opening for the dosing unit.

In the improved mixing device, the flow guide, which functions as a splitting baffle, is added or arranged upstream of the opening for the dosing unit or doser mount. The flow guide thus forms a separate flow passage comprising the gap for the second exhaust gas stream. In this gap or flow passage, a part of the upstream, clean exhaust gas is accelerated in the operation of the mixing device. Consequently, the second exhaust gas stream washes over the side wall in which the opening for the dosing unit is located. Therefore, this side wall or the doser mount surfaces are successfully protected from deposits. Further, the exhaust flow or second exhaust gas stream through the passage or gap allows for an intensive interaction with the existing flow structure. This further improves the mixing and subsequently improves the uniformity of ammonia distribution at substrates of an SCR-catalyst arranged downstream of the mixing device in a corresponding aftertreatment device.

By providing the mixing device with the gap formed between the flow guide and the side wall of the casing, the deposit of urea can be significantly reduced. This results in savings in repair costs and the consumption of the solution for lowering the content of nitrogen oxides in the exhaust gas, which is for example commercially available under the name AdBlue®. As only the flow guide with its specific geometry and dimensions needed to be added to a casing of existing geometry, significant cost savings with respect to tooling and redesign efforts have been achieved.

Also, the mixing device is particularly simple with respect to the design and therefore significantly inexpensive. Further, the mixing device is very compact and effective in mixing and in the mitigation of urea deposit. The mixing device therefore has a high potential for use in applications with limited space, e.g., in particular in vehicles. Also, the back pressure of the mixing device is very low. This is beneficial for the integration of the mixing device into an aftertreatment system of a vehicle.

Preferably, the casing has a bend in which the exhaust gas flow is diverted from the exhaust inlet towards the corner region. Herein, an upstream end region of the flow guide reaches into the bend. Such an arrangement allows for an improved diversion of the second exhaust gas stream from the first exhaust gas stream.

Preferably, in the upstream end region, the flow guide has a rear edge, which is formed as a curved line, wherein the curved line is oriented towards the opening for the dosing unit. This helps in diverting only a fraction of the total of the exhaust gas flow as the second exhaust gas stream through the gap.

The casing can have a tapered region upstream of the exhaust outlet. A diameter of the casing which can be passed by the exhaust gas decreases in the tapered region. The provision of such a tapered region close to the exhaust outlet is beneficial for the formation of a recirculating region within the mixing device, i.e., a region in which spray or droplets of the solution move backwards, i.e., towards the opening for the dosing unit. This improved recirculation leads to a more effective mixing of the solution with the exhaust gas.

In a particularly simple embodiment, the flow guide is formed as a flat plate having two lateral edges. The plate can be fixed to the casing along at least a portion of at least one of the lateral edges.

Preferably, in the end region of the flow guide, which is arranged upstream of the opening for the dosing unit, the flow guide has a front edge which is formed as a straight line. Thus, a well-defined tearing edge of the flow guide is provided which enhances the mitigation or elimination of deposits on the side wall having the opening for the dosing unit and/or on the dosing unit. The straight line can in particular be parallel to the side wall of the casing.

Finally, it has proven advantageous if the flow guide has a plurality of through holes.

The aftertreatment device according to the invention comprises a mixing device according to the invention. The mixing device is arranged within an exhaust line. In the exhaust line, an SCR-catalyst is arranged downstream of the mixing device.

The advantages and preferred embodiments described with respect to the mixing device correspondingly apply to the aftertreatment device.

The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures or explained, but arise from and can be generated by separated feature combinations from the explained implementations. Therefore also embodiments and feature combinations shall be considered as disclosed, which do not have all the features of an originally formulated independent claim.

Further advantages, features and details of the invention are apparent from the claims, the following description of preferred embodiments as well as based on the drawings in which features having analogous functions are designated with the same reference signs.

DETAILED DESCRIPTION OF THE DRAWINGS

Figure 1:
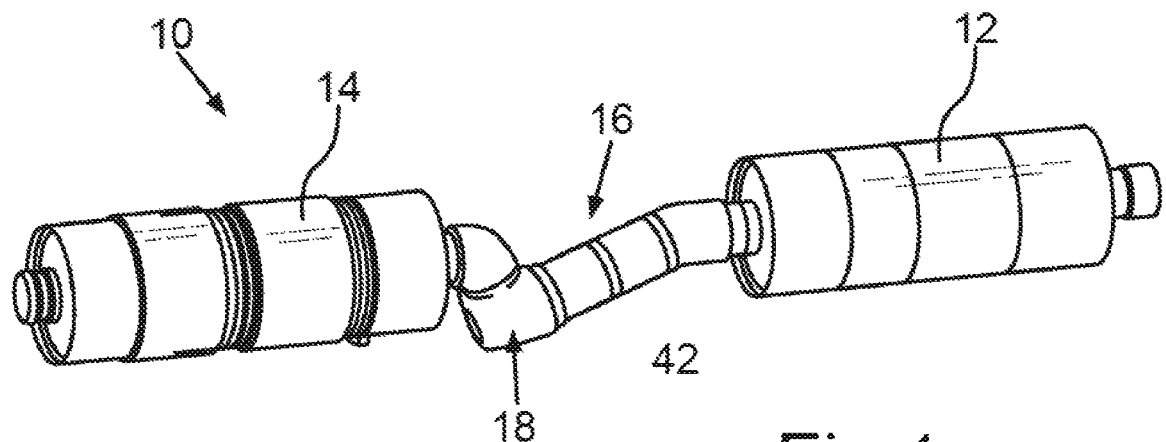
FIG. 1 is a perspective view of components of an aftertreatment device for a vehicle, wherein the components comprise a mixing device.

FIG. 1 shows components of an aftertreatment device 10 for a vehicle. The aftertreatment device 10 comprises aftertreatment units such as an SCR-catalyst 12 and a further aftertreatment unit such as a diesel particulate filter 14. The aftertreatment units are fluidly connected to each other through an exhaust line 16, which comprises a mixing device 18. In variants of the aftertreatment device 10, a particulate filter or an SCR-coated particulate filter can be arranged downstream of the mixing device 18. Further, the aftertreatment device 10 can have other or less than the exemplarily shown aftertreatment units.

Figure 2:
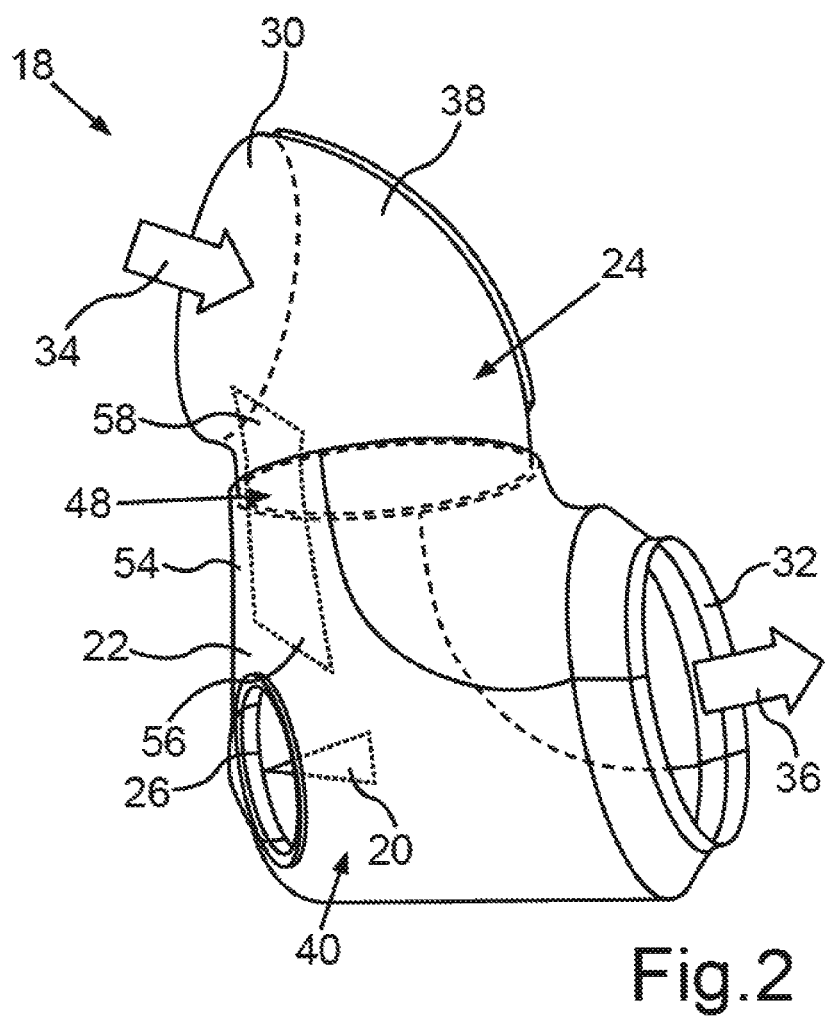
FIG. 2 is an enlarged, perspective view of the mixing device.

In the mixing device 18, which is shown in greater detail in FIG. 2, a solution for lowering the content of nitrogen oxides in the exhaust gas, for example a urea solution 20, is injected into the exhaust gas flowing through the mixing device 18. The urea solution 20, which is injected into the mixing device 18 by a (not shown) dosing unit such as a urea doser, is illustrated as a spray cone in FIG. 2. A side wall 22 of a casing 24 of the mixing device 18 has an opening 26. The opening 26 receives a mounting structure 28 (see FIG. 5), which holds the urea doser (not shown). Through a nozzle of the urea doser the urea solution 20 is injected into the casing 24.

The casing 24 has an exhaust inlet 30 and an exhaust outlet 32 (see FIG. 2). The exhaust gas entering the mixing device 18 through the exhaust inlet 30 is illustrated in FIG. 2 by a first arrow 34. A mixture which comprises the urea solution 20 and the exhaust gas and which leaves the mixing device 18 through the exhaust outlet 32 is illustrated by a further arrow 36 in FIG. 2. From the exhaust inlet 30 of the mixing device 18, the exhaust gas first flows through a bend 38 of the casing. In the bend 38 the exhaust gas flow is diverted from the exhaust inlet 30 towards a corner region 40 of the casing 24.

The corner region 40 substantially has an L-shape. However, the inflow direction of the exhaust gas flowing into the exhaust inlet 30 substantially coincides with the outflow direction of the mixture comprising the exhaust gas and the urea solution 20 and leaving the exhaust outlet 32. The mixing device 18 is therefore particularly well adapted for an arrangement within the aftertreatment device 10 in which two aftertreatment units such as a diesel particulate filter 14 and the SCR-catalyst 12 are arranged in a substantially horizontal configuration. In such a configuration, a compact mixing device 18 is required due to space limitations.

At the exhaust outlet 32, the mixing device 18 is connected to a straight pipe 42 of the exhaust line 16 (see FIG. 1). There are mixing devices in which the mixing of the exhaust gas with the urea solution 20 mainly takes place after the urea droplets have been carried by the exhaust gas to this downstream straight pipe 42. This leads to a more diffusion-like mixing mechanism, since normally forced mixing inside a straight pipe 42 is not very strong or effective.

Figure 3:
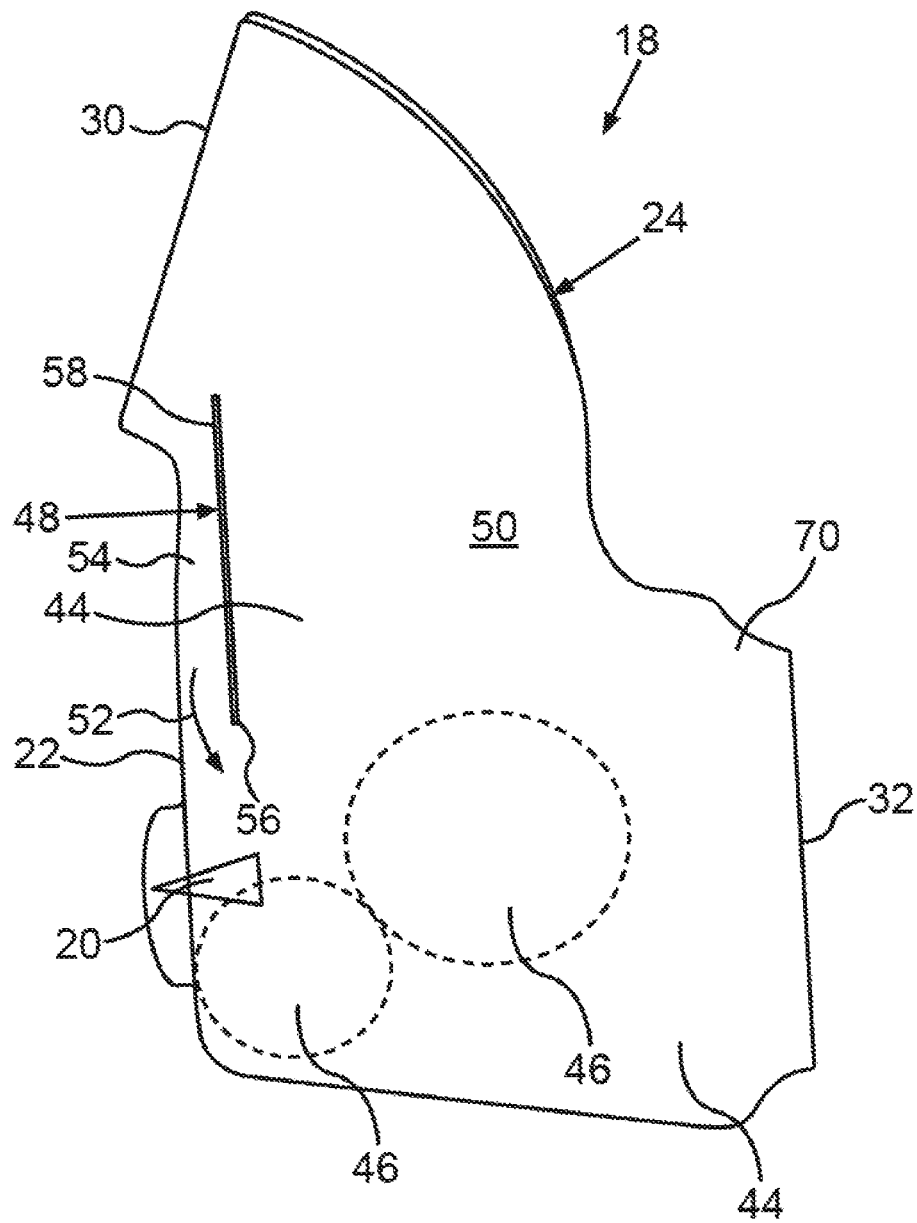
FIG. 3 is an enlarged section view of the mixing device.

However, in the mixing device 18 shown in FIG. 2, the primary mixing mechanism is forced mixing. The mixing mainly takes place at the corner of the mixing device 18, i.e., within the corner region 40. Correspondingly, FIG. 3 shows a recirculating region 44 within the casing 24, in which the exhaust gas flowing through the mixing device 18 has a particularly low speed. Flow structures 46 in the recirculating region 44 are indicated in FIG. 3 by circles. These flow structures lead to an enhanced mixing of the urea solution 20 with the exhaust gas. In other words, within the corner region 40 of the mixing device 18, a few exhaust swirls naturally exist due to the geometry of the casing 24.

However, this recirculation of droplets of the urea solution 20 can lead to the formation of urea deposits on the side wall 22 and/or on a nozzle of the urea doser. The formation of such deposits is prevented by the arrangement of a flow guide configured as a plate-like splitting baffle 48 within the casing 24 (see FIG. 2). The baffle 48 which is configured as a flat plate divides a total of the exhaust gas flow which enters the mixing device 18 through the exhaust inlet 30 into a first, main exhaust gas stream 50 and a much smaller second exhaust gas stream 52 (see FIG. 3).

The main exhaust gas stream or first exhaust gas stream 50 is characterized by higher speeds of the exhaust gas within the casing 24 than the speeds that exist within the recirculating region 44. The second exhaust gas stream 52 is illustrated in FIG. 3 by an arrow. This second exhaust gas stream 52 flows through a gap 54 between the baffle 48 and the side wall 22 in which the opening 26 for the urea doser is located.

Through the gap 54 a part of the total exhaust gas flow, which forms the second exhaust gas stream 52, flows with high speed towards the opening 26 and therefore towards the location where the urea solution 20 is injected into the mixing device 18. This high-speed clean exhaust in the splitting flow passage prevents the formation of urea deposits around the urea doser within the mixing device 18. The second exhaust gas stream 52 also strongly interacts with the complex flow structure 46 in the recirculating region 44, which further enhances the mixing between urea spray and exhaust flow.

A downstream end region 56 of the baffle 48 is arranged upstream of the opening 26 for the urea doser. On the other hand, an upstream end region 58 of the baffle 48 reaches into the bend 38 of the casing 24. As the gap 54 is rather small, i.e., as the baffle 48 is arranged very close to the side wall 22, the second exhaust gas stream 52 is much smaller than the main exhaust gas flow or first exhaust gas stream 50. For example, a width of the gap 54 can be about 10 mm to 15 mm, in particular about 12 mm.

Figure 4:
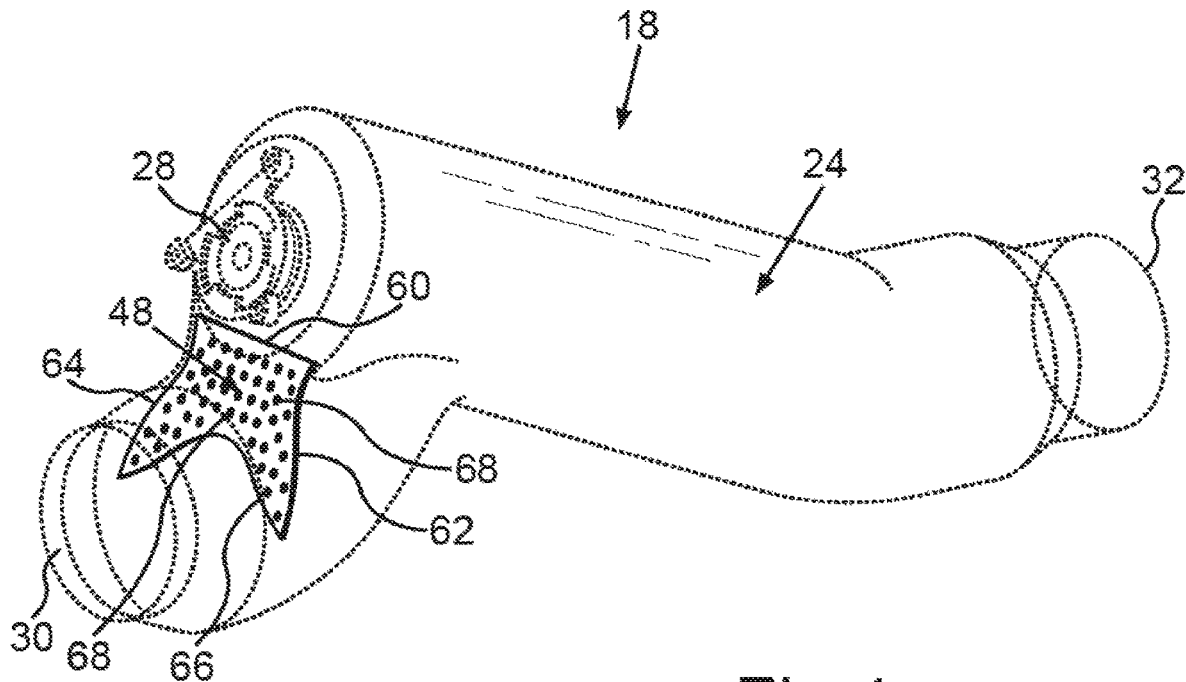
FIG. 4 is a further perspective view of the mixing device.

As can be seen particularly well from FIG. 4, the end region 56 of the baffle 48 can have a front edge 60, which is formed as a straight line and which can in particular be parallel to the side wall 22 of the casing 24. Further, the baffle 48 can be fixed to the casing 24 along lateral edges 62, 64 of the baffle 48. In the upstream end region 58, the baffle 48 can have a rear edge 66, which can be formed as a curved line. Herein, the curved line can be oriented towards the opening for the urea doser (see FIG. 4). Further, the baffle 48 can have a plurality of through holes 68.

As can be seen from FIG. 3, the casing 24 can have a tapered region 70 upstream of the exhaust outlet 32. In the tapered region 70, a diameter of the casing decreases, which can be passed by the exhaust gas. This shape of the casing 24 contributes to the formation of the recirculating region 44 within the mixing device 18.

After the forced mixing, which takes place primarily in the recirculating region 44, the mixture of the urea solution 20 and the exhaust gas is further mixed with the main exhaust stream at the entrance of the straight pipe 42, i.e., after the mixing device 18. This multiple stage mixing mechanism significantly improves the urea evaporation rate and produces a high uniformity of a mixture containing ammonia (NH3) and exhaust gas when substrate surfaces of the SCR-catalyst 12 (see FIG. 1) are reached.

In particular the bend 38 and the L-shape of the corner region 40 in the design of the mixing device 18 naturally form the flow recirculating region 44. Also, the L-shape of the corner region 40 provides a flat surface for the installation of the urea doser. The splitting baffle 48 guides a part of the incoming exhaust flow, i.e., clean exhaust gas or exhaust gas without urea, to the region of the side wall 22 where the urea doser is mounted. Thus, the urea doser mount area is protected from being contaminated by recirculated urea. Also, the division of the total exhaust gas flow into the main or first exhaust gas stream 50 and the second exhaust gas stream 52 provides further chances for the mixing of the urea solution 20 with the exhaust gas in the recirculating region 44.

Figure 5:
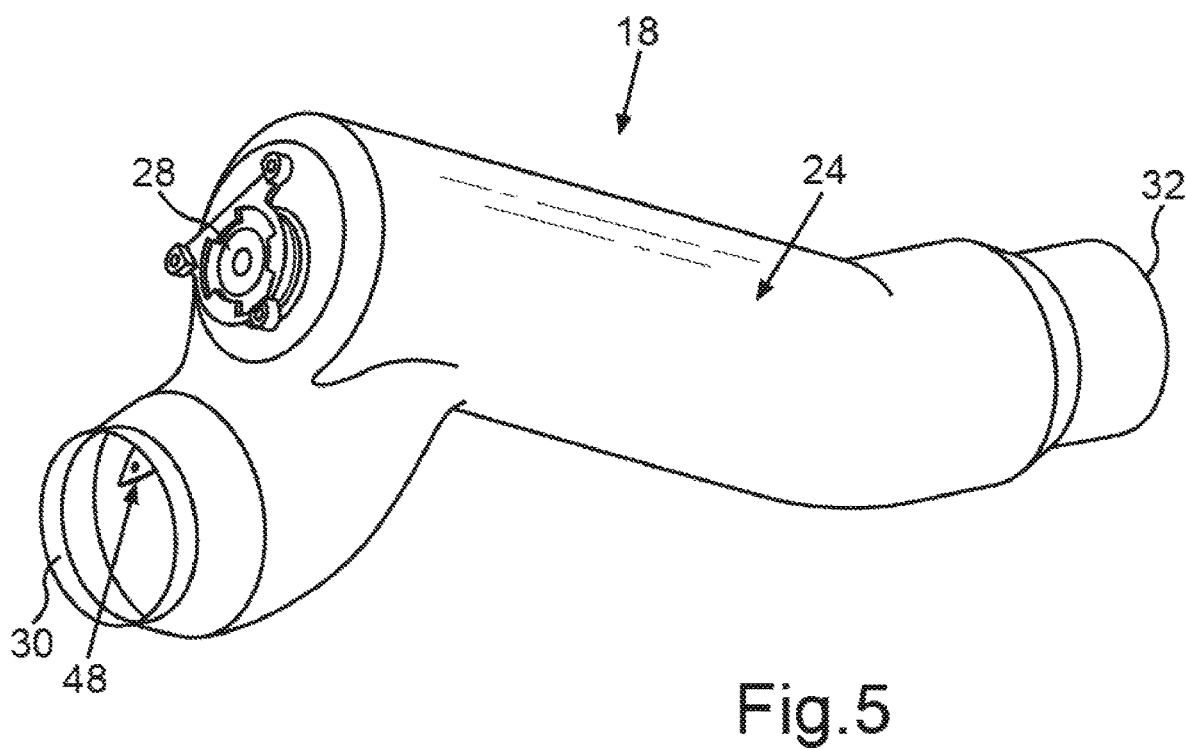
FIG. 5 is another perspective view of the mixing device.

From FIG. 4 as well as from FIG. 5 can also well be seen that the main flow direction of the exhaust gas entering the exhaust inlet 30 and of the urea/exhaust gas mixture leaving the mixing device 18 at the exhaust outlet 32 substantially coincide.

LIST OF REFERENCE CHARACTERS 10 aftertreatment device
12 SCR-catalyst
14 diesel particulate filter
16 exhaust line
18 mixing device
20 urea solution
22 side wall
24 casing
26 opening
28 mounting structure
30 exhaust inlet
32 exhaust outlet
34 arrow
36 arrow
38 bend
40 corner region
42 pipe
44 recirculating region
46 flow structure
48 baffle
50 first exhaust gas stream
52 second exhaust gas stream
54 gap
56 end region
58 end region
60 front edge
62 lateral edge
64 lateral edge
66 rear edge
68 through hole
70 tapered region

The invention claimed is:

1. A mixing device for mixing exhaust gas from a combustion engine of a vehicle with a solution for lowering a content of nitrogen oxides in the exhaust gas, comprising:
a casing with an exhaust inlet, an exhaust outlet, and a corner region, wherein an exhaust gas flow is divertable in the corner region toward the exhaust outlet and wherein the corner region has an opening for a dosing unit; and
a flow guide disposed within the casing, wherein the flow guide is configured to divide a total of the exhaust gas flow into a first exhaust gas stream and a second exhaust gas stream and wherein an entirety of the flow guide is disposed upstream of the opening for the dosing unit;
wherein a gap for the second exhaust gas stream is formed between the flow guide and a side wall of the casing, wherein the opening for the dosing unit is disposed in the side wall, wherein a downstream end region of the flow guide is disposed upstream of the opening for the dosing unit, and wherein the second exhaust stream is accelerated in the gap and flows toward the opening for the dosing unit and therefore toward a location where the urea solution is injected into the mixing device and the second exhaust stream washes over the side wall in which the opening for the dosing unit is located;
wherein the casing has a bend in which the exhaust gas flow is divertable from the exhaust inlet toward the corner region and wherein an upstream end region of the flow guide reaches into the bend;

and wherein the flow guide has a rear edge in the upstream end region which is formed as a curved line which is oriented toward the opening for the dosing unit.

2. The mixing device according to claim 1, wherein the casing has a tapered region upstream of the exhaust outlet and wherein a diameter of the casing which is passable by the exhaust gas decreases in the tapered region.

3. The mixing device according to claim 1, wherein the flow guide is a flat plate having two lateral edges.

4. The mixing device according to claim 3, wherein the flat plate is fixed to the casing along at least a portion of at least one of the two lateral edges.

5. The mixing device according to claim 1, wherein the flow guide has a front edge in the downstream end region which is formed as a straight line.

6. The mixing device according to claim 5, wherein the straight line is parallel to the side wall of the casing.

7. The mixing device according to claim 1, wherein the flow guide has a plurality of through holes.

8. An aftertreatment device, comprising:
   an exhaust line;
   the mixing device according to claim 1 disposed within the exhaust line; and
   a selective catalytic reduction (SCR)-catalyst disposed in the exhaust line downstream of the mixing device.

* * * * *